March 4, 1930.     T. G. JUNGERSEN     1,749,587
DUMPING CAR BODY OR CAR TOP

Filed March 21, 1927

Inventor
T. G. Jungersen
By: Marks & Clerk
Attys.

Patented Mar. 4, 1930

1,749,587

UNITED STATES PATENT OFFICE

THÓGER GRÓNBORG JUNGERSEN, OF LYNGBY, NEAR COPENHAGEN, DENMARK

DUMPING CAR BODY OR CAR TOP

Application filed March 21, 1927, Serial No. 177,127, and in Denmark May 31, 1926.

The present invention relates to arrangements in dumping car bodies or car tops. The invention is chiefly intended for use with motor trucks, but may, of course, also be used with other dumping cars of any kind, the body or top of which shall be dumped sideways or over end, relatively to its chassis.

Figure 1:
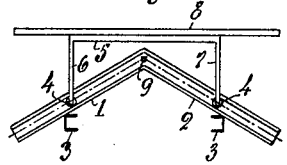

The invention is diagrammatically shown in the drawings in 8 different modifications. Fig. 1 shows the body or top and the dumping arrangement in end view and with one form of the dumping tracks, whereas Figs. 2 to 8 show seven modifications of these tracks.

In the drawings all parts which are not necessary for understanding the invention have been omitted.

The numerals 1, 2 represent an angular track which may, for example, be made of channel iron. To the car there will be fitted two or more such tracks arranged parallel to each other, somewhat like the rafters in a roof, along the sides 3 of the chassis frame.

Figure 3:
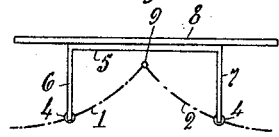
Figure 6:
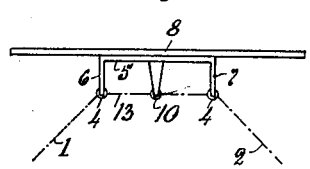

These rafter-like tracks may have the shape of a pointed angle, Fig. 1, or may be curved, Fig. 3, or be of a polygonal shape as shown in Fig. 6.

In the tracks 1, 2 travel guide rollers 4 journalled in a top 5, 6, 7 on which the car body or car top is secured. The car body or car top is thus supported by two or more top members 6, 7, the downward ends of which all have rollers 4 travelling in the rafter shaped guide tracks 2.

When the car body or car top shall be dumped, a lock, not shown in the drawing, is undone and the car body or top is then pushed to the respective side to which the car is to be dumped. As soon as the centre of gravity of the car body or top has been shifted a very small distance, the further movement will continue automatically until one of the rollers 4 meets the stop 9.

By the centre of gravity of the car body or car top being shifted in a horizontal or almost horizontal direction, the power which will be required for returning the body or top into the position shown in Fig. 1 will be very small.

In Fig. 3 another modification is shown as hereinbefore said, as the two tracks 1 and 2 are here shown somewhat curved. The consequence will be that the centre of gravity of the body or top will, in dumping, be lifted slightly while it simultaneously is being shifted sideways. However the weight of the load over the body or the top will instantly cause the one set of the car springs to be compressed so that the centre of gravity will shift in a downward slanting line. When the load has been discharged the springs will rise again so far that the centre of gravity of the body or top in the dumped position will be higher than at the car's normal position so that the car body or top will automatically, or at all events by aid of a very small amount of power only, return into the position shown in Fig. 3.

Figure 2:
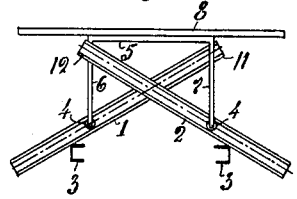
Figure 4:
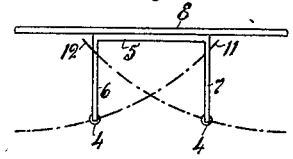
Figure 5:
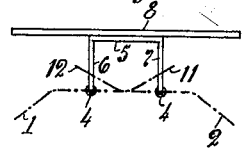

In Fig. 6 are shown two side tracks connected by a horizontal straight section 13, and in Figs. 2, 4 and 5 are shown modifications in which the two tracks have upwardly directed extensions 11 and 12. In Figs. 2 and 5 these extensions are straight and in Fig. 4 they are curved.

In the modification shown in Fig. 6 the car body or top 8 may, as shown, be fitted with supporting legs 10 disposed in the middle between the rollers 4 and so that this leg is intended to bear the weight of the car body or top while the rollers 4 only travel in the tracks so that the right hand roller is lifted from its track when the car body or top is dumped to the left and the left roller is lifted when the car body or top is dumped to the right.

The curvature of the two tracks 1, 2 may be varied in different ways according to conditions. It may be added that the car will, furthermore, have the advantage that the car body or top, when stopped in its dumping movement, will impart to the load a swinging motion so that a complete discharge will be ensured, as the contents of the car will be flung away from the car. This is of great importance when the load is a sticky mass, and besides, the load will be thrown so far to the side that it will clear the wheels.

In the modifications shown in Figs. 2, 4 and 5 the bottom of the car body or top can be dumped quite over into a vertical, or almost vertical, position.

Figure 7:
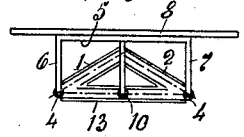

Fig. 7 shows a modification in which the car body or top is supported by three rollers, the same as shown in Fig. 6, which rest on a horizontal track 13 or only on a plain support with slanting side track 1, 2. If, for example, the car is to be dumped, to the left, the left roller 4 will leave the support 13 and move downwards while at the same time the roller 4 on the right hand will travel upward in the track 2, the middle roller 10 in this time moving a little to the left without, however, reaching the end of the support 13, as the distance from the roller 10 to the rollers 4 is greater than the height of the triangle formed by the tracks, but shorter than the sides.

Figure 8:
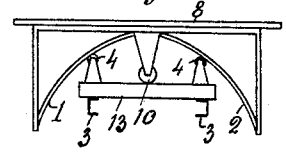

Fig. 8 is a modification in which the rollers are fitted in bearings on the chassis frame while the tracks are attached to the car body or top.

Having thus described and ascertained the nature of my said invention and in what manner it is to be performed, I declare that what I claim and desire to secure by Letters Patent is:

1. The combination in a dumping car of a frame member, a body member, rollers carried by one of said members, and inclined intersecting trackways carried by the other of said members and having upward extensions beyond their point of intersection, said trackways coacting with said rollers to permit the dumping movement of said body.

2. The combination in a dumping car, of a frame member, a body member, rollers carried by one of said members, and a pair of relatively inclined intersecting trackways carried by the other of said members and having channel-shaped guides in the sides thereof for engagement by said rollers to permit the dumping movement of said body.

3. The combination in a dumping car, of a frame member, a body member, supports carried by one of said members, rollers mounted on said supports, a pair of relatively inclined intersecting trackways carried by the other of said members and having channel-shaped guides in their lateral sides for engagement with said rollers, and means located at the upper end of each inclined trackway for engaging one of said rollers to limit the dumping movement of said body.

4. The combination in a dumping car, of a frame member, a body member, rollers carried by one of said members, inclined tracks carried by the other of said members and coacting with said rollers to permit the dumping of said body and to maintain the center of gravity of said body and its load in a substantially horizontal path of travel during the dumping movement, and guiding means extending parallel to said tracks for preventing movement of said rollers away from said tracks.

In testimony whereof I affix my signature.

THÓGER GRÓNBORG JUNGERSEN.